Aug. 23, 1960 — G. W. SCHNEIDER, JR — 2,950,396
COLORIMETRIC ANALYZER
Filed Sept. 14, 1956 — 6 Sheets-Sheet 1

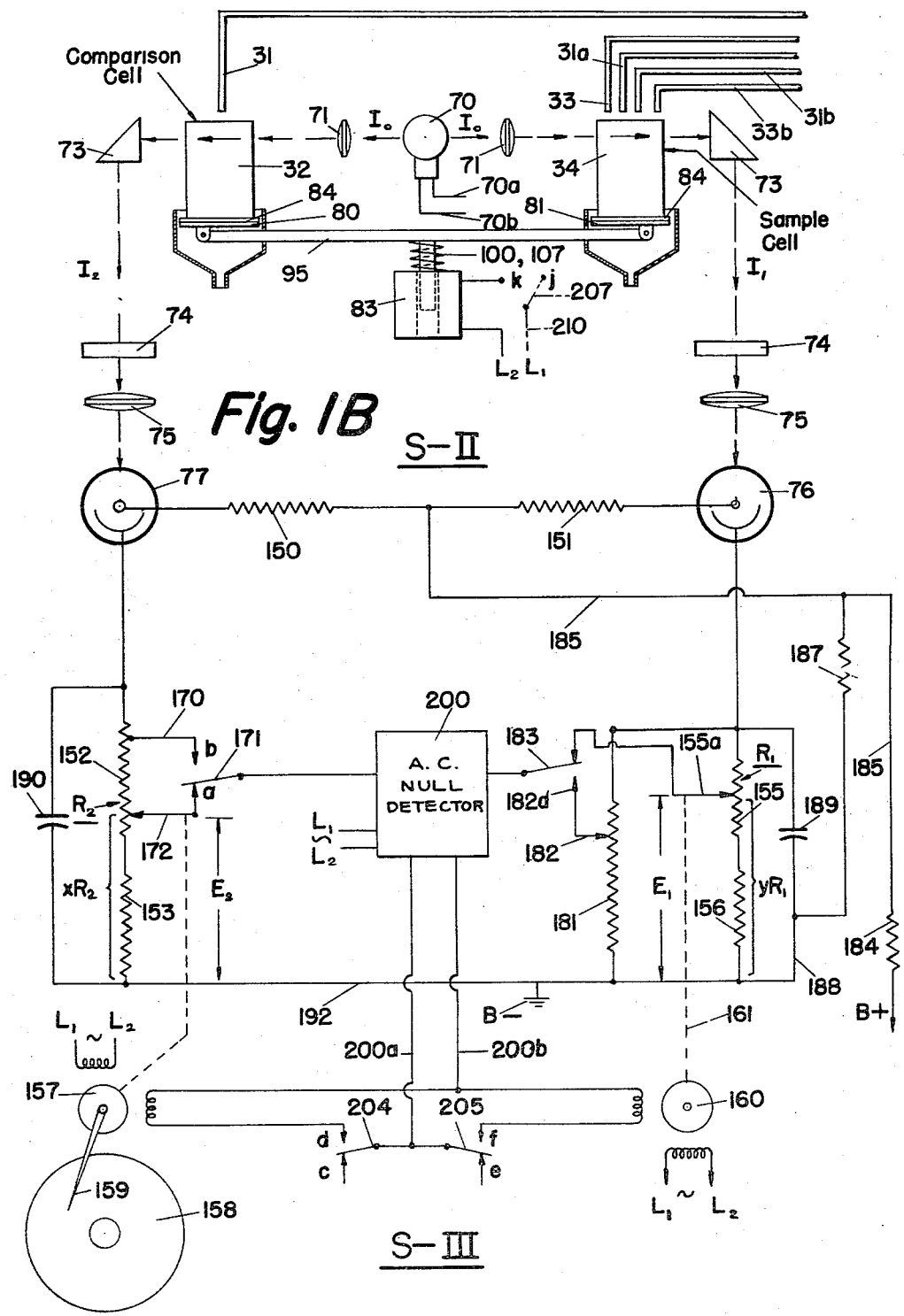

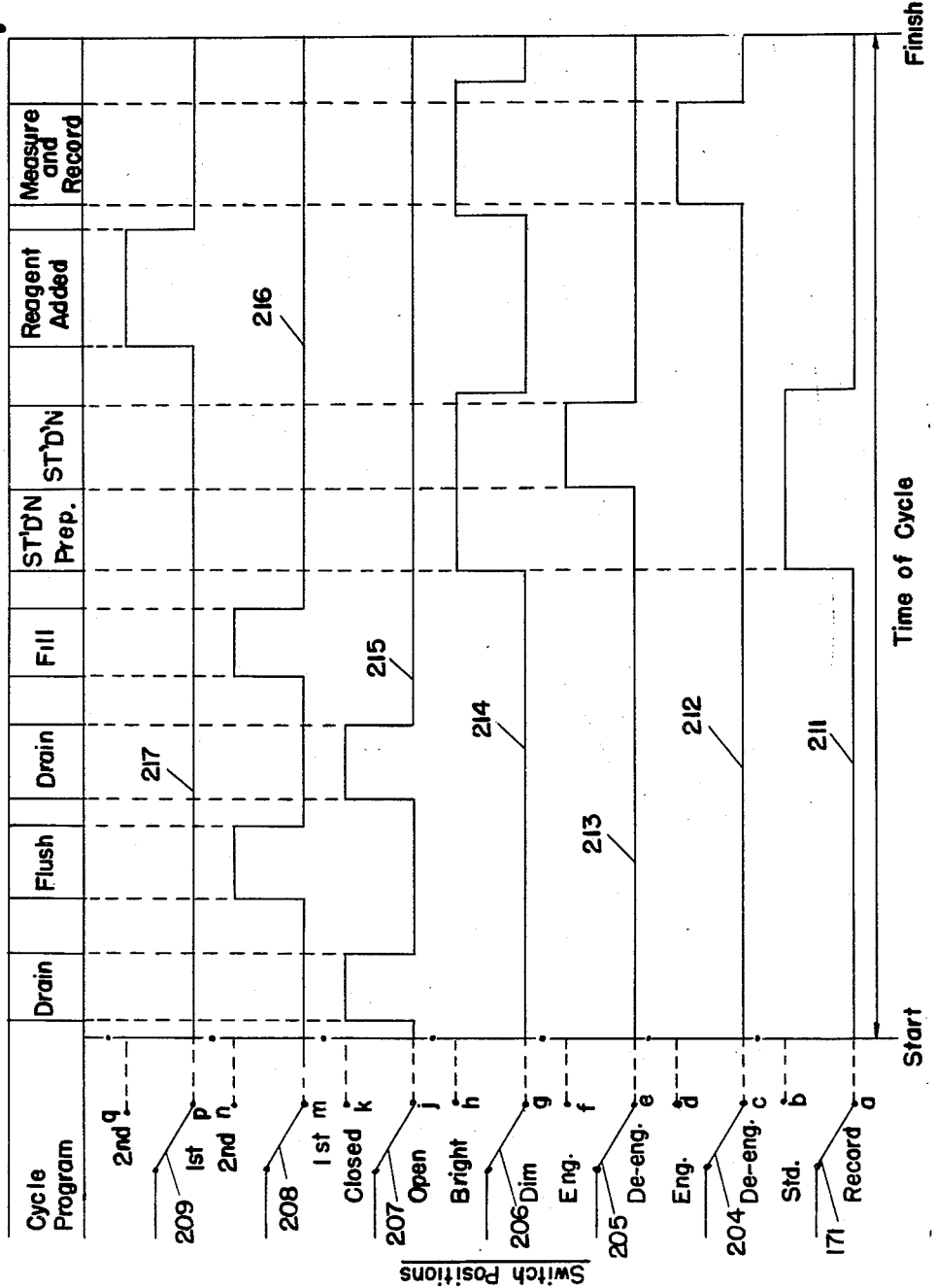

United States Patent Office 2,950,396
Patented Aug. 23, 1960

2,950,396
COLORIMETRIC ANALYZER

George W. Schneider, Jr., St. Petersburg, Fla., assignor to Milton Roy Company, Philadelphia, Pa., a corporation of Pennsylvania Filed Sept. 14, 1956, Ser. No. 609,981

22 Claims. (Cl. 250—219)

This invention relates to colorimetric analyzers and has for an object the provision of an automatic photocolorimeter for first automatically sampling the fluid to be analyzed and then chemically analyzing such sample for various constituents by improved colorimetric techniques. The novel analyzer permits the automatic and improved performance of many chemical analyses such for example as the analysis of water for silica, calcium and magnesium hardness, residual chlorine, sugar, phosphates and the like.

In accordance with the present invention there is provided a colorimetric analyzer having controlled volume dispensing means for sampling the fluid to be analyzed and for adding reagent to the predetermined volume of fluid sample. The analyzer also includes a sampling cell and a comparison cell flow connected to the dispensing means and a source of radiant energy for directing radiant energy through these cells. A ratio-measuring means is provided which includes a standardizing circuit and radiant energy sensitive means for receiving the radiant energy after passage through each of the cells. Automatic control of the analyzer is provided by a cycle controller for actuating the dispensing means to introduce known volumes of sampling fluid into each cell and thereafter initiating a standardizing operation by adjusting the ratio-measuring means to bring the circuit to zero after delivery of the sampling fluid to both cells. The cycle controller then actuates the dispensing means to introduce at least one reagent into the sampling cell in known volume and strength for producing a color change of the fluid within the sampling cell which changes the radiation-transmitting properties of the resultant mixture in the sampling cell by an amount related to the concentration of a constituent in the fluid within the sampling cell. The concentration of the constituent in the sampling cell is then indicated by suitable means such for example as a recorder operable under the control of the ratio-measuring means.

The present invention provides an accurate and reliable means for automatically feeding the sample fluid and various reagents to the photocolorimeter and automatically compensates for any turbidity or color in the fluid being measured. By automatically standardizing the measuring circuit after known volumes of sampling fluid have been delivered by the dispensing means into both the sampling cell and the comparison cell there is provided automatic compensation for differences in light beam intensities due to the accumulation of dirt on the optics or on the windows of the sample cells. Further to insure the accuracy of the analyzer its measuring circuit is of the null-balance type which is independent of the variations in light source brightness, phototube characteristics, temperature and line voltage.

For a more detailed disclosure of the invention and for further objects and advantages thereof, reference is to be had to the following description taken into conjunction with the accompanying drawings in which:

Figs. 1A and 1B combined illustrate schematically an automatic colorimetric analyzer embodying the present invention;

Fig. 9 is a timing diagram of the control cycle for the analyzer.

Figure 1A:
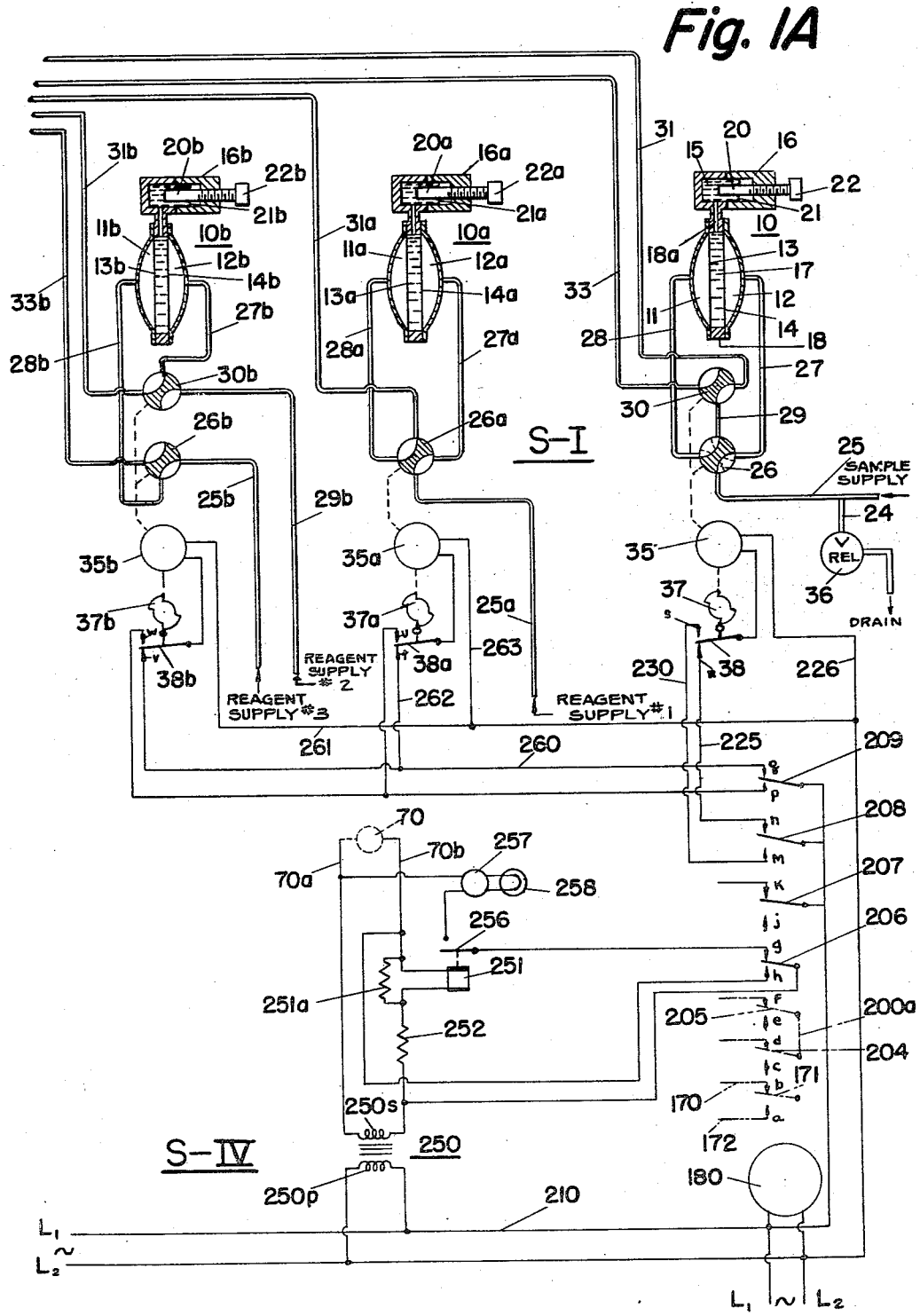

To facilitate the explanation and understanding of the present invention the automatic colorimetric analyzer may be considered as consisting of four sections identified in Figs. 1A and 1B by general reference characters S–I to S–IV. Section I which occupies approximately the upper half of Fig. 1A comprises the sample and reagent controlled volume dispensing means. This section of the analyzer supplies the fluid samples and reagents to Section II of the analyzer which includes the sample cell and comparison cell and the light source and occupies approximately the upper half of Fig. 1B. This section of the system also includes the remainder of the optical system as well as the radiant energy sensitive devices or phototubes which receive the radiant energy after it passes through the sample cell and comparison cell. Section III of the system or analyzer is illustrated at the bottom half of Fig. 1B and includes a null-balance type measuring circuit and recorder. Section IV of the analyzer is illustrated at the bottom of Fig. 1A and includes the cycle controlling or programming apparatus for the analyzer.

*Section I.—Sample and reagent controlled volume dispensing system*

Referring to Fig. 1A, and particularly Section I thereof, the dispensing means for the sample and the reagent have been illustrated as controlled volume pumps 10, 10a and 10b. While two reagent pumps 10a and 10b have been illustrated it is to be understood that any number of these pumping units may be employed depending upon the particular analysis involved. The sampling pump 10 is of the type which derives its energy for operation from the supply pressure of the sampling fluid. In general a positive pressure of the sampling fluid supply of about ten pounds per square inch or above will provide adequate operation of the pump. This is a normal condition in most of the process applications to which this instrument is applicable and thus it is not necessary to provide an auxiliary pump to develop the foregoing minimum pressure. The pump 10 is divided into two chambers 11 and 12 of equal volume separated by a pair of flexible diaphragms 13 and 14. The diaphragms 13 and 14 are themselves spaced from each other and adapted to form a chamber therebetween for receiving a liquid 15 of variable volume from a reservoir 16. The liquid 15 within the reservoir 16 communicates with the chamber 17 between the spaced diaphragms 13 and 14 by way of a passage 18a in a spacer ring 18. To vary the volume of liquid 15 within the reservoir 16, and likewise within the chamber 17 between the flexible diaphragms, there is provided a plunger 20 which is adapted for movement into or out of the reservoir 16. The end of the plunger 20 within the reservoir 16 is adapted to engage a flexible diaphragm 21 which prevents leakage of the liquid 15 past the plunger 20. The position of the plunger 20 is controlled by means of the adjusting screw 22. When the plunger 20 is moved to the left as viewed in Fig. 1A the volume of liquid within the reservoir 16 is decreased and the volume of liquid between the pair of diaphragms 13 and 14 is correspondingly increased. Movement of the plunger 20 in reverse direction causes a decrease in the volume of liquid within the chamber 17 between the flexible diaphragms 13 and 14 and an increase in the volume of liquid within the reservoir 16. While the pump chambers 11 and 12 have been illustrated as having walls of spherical shape, it is of course understood that they may take other forms.

In describing the operation of the sampling pump it will be assumed that the plunger 20 has been adjusted to provide the required capacity for the diaphragm chambers 11 and 12 of the pump. The sample supply enters the analyzer by way of inlet pipe 25 at a supply pressure of from 10 to 20 p.s.i. and flows through a passage in a four-way valve 26, through a pipe 27 to chamber 12, forcing the double diaphragm device 13—14 to the left, displacing the liquid previously trapped in chamber 11 out through pipe 28, through another passage in valve 26 and pipe 29 to the three-way valve 30 and thence to the outlet line 31. As may be seen in Fig. 1B the outlet line 31 connects with the zero blank or comparison cell 32. The four-way valve 26 is of the rotary type adapted for actuation by an electric rotary solenoid or motor 35. The valve 26 may take various forms. For example it may be of the type later described in the present application or it may be of the flexible sealing means type described and claimed in the copending application Serial No. 599,628, now Patent No. 2,881,958, filed July 23, 1956, by Robert T. Sheen. It will be noted that the supply line for valve 26 is pipe 25 and the discharge for valve 26 is pipe 29. The discharge line 29 connects with the three-way valve 30 which in turn controls the discharge through outlet line 31 to the comparison cell 32 and to the second outlet line 33 which connects with the sampling cell 34 in Section II, Fig. 1B. After the initial pumping stroke of pump 10 the motor 35, which operates in stepping fashion, rotates both the four-way valve 26 and the three-way valve 30 to reverse the connections to pump 10 with the flow passages through the four-way valve 26 then being in the position illustrated by the dotted lines in Fig. 1A. With the valves 26 and 30 in their new positions the liquid passes from supply line 25 through valve 26 and line 28 into pump chamber 11 forcing the liquid from the previously filled chamber 12 out through line 27 to valve 26 and discharge line 29 to valve 30 and thence through outlet line 33 to the sampling cell 34, Fig. 1B.

Connected with supply line 25 is a by-pass line 24 having a relief valve 36 which by-passes a steady stream of sample fluid to a drain or back to the sample supply when the sample pump 10 is not operating. This arrangement assures that a representative sample will always be available at the sampling pump 10 and eliminates the possibility of any time lost due to sample line hold up. With a sample supply pressure of about 20 p.s.i. the relief by-pass valve 36 will have a pressure setting of about 10 p.s.i.

The motor 35 which drives both the four-way valve 26 and the three-way valve 30 preferably is a slow speed gear type motor and positions the valves in 90° steps by means of a positioning cam 37 and a limit switch 38 both driven by the motor 35. The stationary contacts of the limit switch 38 are in an electrical circuit with a reversing switch in Section IV, the cycle controller section, as later to be described.

One or more reagents may be added to the sampling cell of the analyzer by one or more reagent metering pumps constructed similarly to the sample pump 10. In Fig. 1A two reagent metering pumps 10a and 10b have been illustrated. The reagent pumps 10a and 10b are of the same general construction as the sample pump 10 and they are operated in the same manner. For that reason like parts of pumps 10a and 10b have been identified with the same reference characters as corresponding parts in sample pump 10 but with the addition of letters a or b as the case may be. While the reagent pumps 10a and 10b are of the same general construction as sample pump 10 they will ordinarily have a smaller capacity than the sample pump. For example, the pumping chambers of the sample pump 10 may have a capacity in the order of ten or more cc. while the capacity of the pumping chambers in the reagent pumps 10a and 10b will be much smaller for example in the order of one or two cc. It is to be understood that the foregoing numerical values are by way of example and not of limitation.

The reagent measuring pump 10a has been illustrated as including a four-way valve 26a and is adapted for metering one reagent. The reagent supply pipe 25a is adapted to be connected to a suitable reagent supply, the latter having a supply pressure normally of about ten p.s.i. The reagent metering pump 10b is provided with a three-way valve 26b and a three-way valve 30b similar to the arrangement of the sample pump 10. However, the valves 30b and 26b are not interconnected, as was the case in the sample pump 10, the purpose of the two valves being to permit the same pump 10b to meter two different reagents. Pipe 29b is adapted to provide the inlet from the second reagent supply and pipe 25b provides the inlet from the third reagent supply. The second and third reagent supplies will likewise have a supply pressure of about ten p.s.i. Such supply pressure may be provided by suitable pumping means, not shown. For convenience, the pressure for the reagent supply may be provided by means of a single stroke plunger type pump which is also adapted to deliver the reagents from their storage containers, such pump being described and claimed in my application Serial No. 609,935, filed September 14, 1956.

While the invention has been described as including controlled volume dispensing means for dispensing three reagents to the photocolorimeter, it is to be understood that either a greater or lesser number of reagents may be employed depending upon the particular analysis being performed. For example, if only one reagent is being added, reagent pump 10b may be omitted from the system. Likewise if two reagents are being added, reagent pump 10a may be omitted. Also in Fig. 1B while all of the outlets from the reagent metering pump 10a and 10b have been shown as emptying into the sample measuring cell 34, it will be understood that one or more of these outlets may be directed into the comparison cell 32 depending upon the particular analysis. The system as illustrated in Figs. 1A and 1B is specifically applicable to the analysis of water for silica. However, this invention is equally applicable to other forms of analysis, as aforementioned, such as hardness. In the latter case it is customary to add a reagent to the comparison cell in addition to a sample and thus the outlet from reagent pump 10a may be disposed for depositing a controlled volume of reagent into the comparison cell 32 while reagent pump 10b dispenses the reagents to the sample measuring cell 34.

The sample pump 10 and the reagent pumps 10a and 10b by reason of their construction permit the quantity delivered per pump stroke to be very accurately controlled and the quantity may be adjusted, when desired, by varying the volume of liquid contained in the chamber 17 between the flexible diaphragms 13 and 14. The repeatable accuracy, i.e., the ability to perform in precisely the same way time after time of such pumps has been found to be at least as high as within one-half of 1% per stroke and thus it is possible to dispense with great accuracy the sample fluid and the various reagents to be employed in the analysis by the present analyzer.

Figure 2:
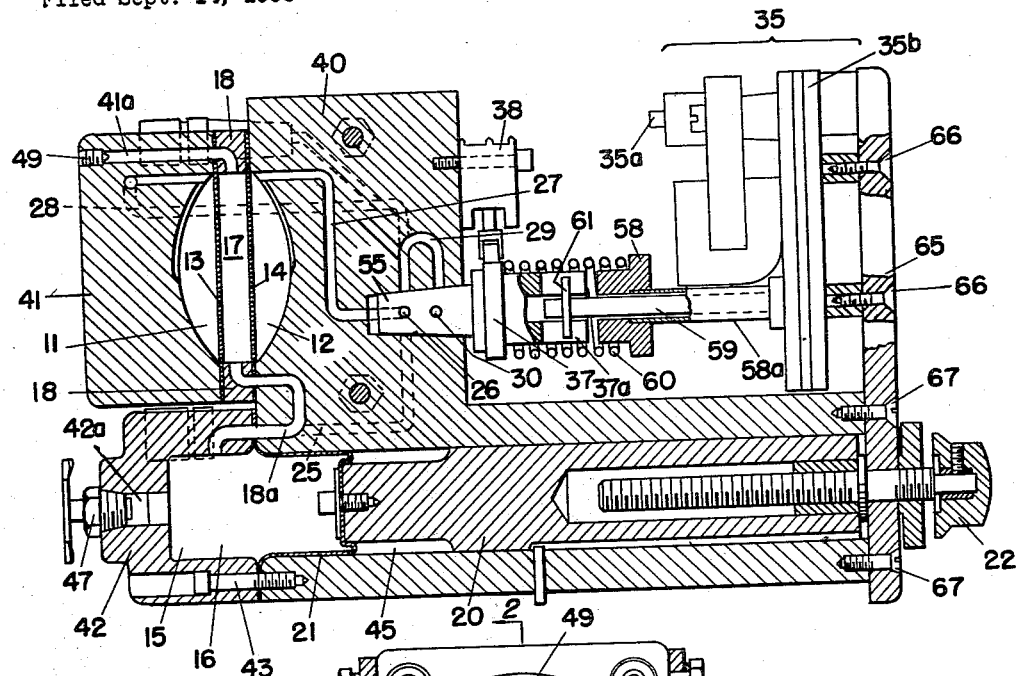
Fig. 2 is a sectional view of one of the controlled volume dispensing pumps diagrammatically illustrated in Fig. 1A.
Figure 3:
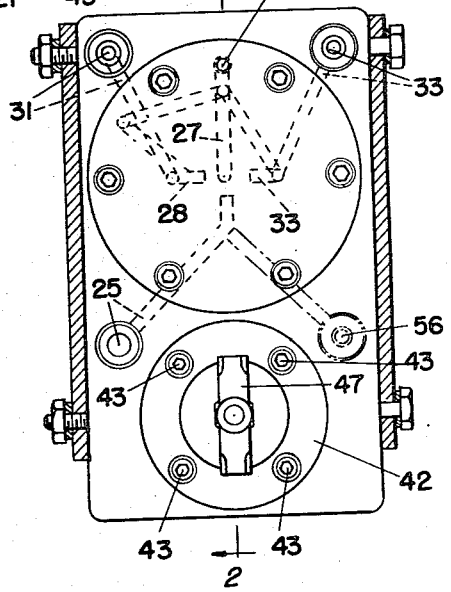
Fig. 3 is a rear end view of the controlled volume dispensing pump shown in Fig. 2.

Referring to Fig. 2, there is illustrated in section one form of the sample pump 10 which was diagrammatically illustrated in Fig. 1A. The piping for the pump is formed by the internal passages within the blocks 40 and 41. These block members also form the spherical walls respectively of the pump chambers 11 and 12. The flexible diaphragms 13 and 14 are separated by the spacer ring 18 through which extends the internal passage 18a which connects the chamber 17 between the diaphragms 13 and 14 with the liquid 15 in the reservoir 16. The reservoir 16 is formed by a cup-shaped member 42 which cooperates with the flexible diaphragm 21 to retain the liquid 15. The peripheral area of the diaphragm 21 is adapted to be held between the cup-shaped member 42 and block 40 by means of a plurality of screws 43, Figs. 2 and 3. The central portion of the flexible diaphragm 21 is fixed to and movable with the plunger 20 which is adapted to be reciprocable within a cylinder bore 45 in block 40 by means of the adjusting screw 22. To add or replace the liquid 15 within the reservoir 16 the cup member 42 has a filling passageway 42a extending therethrough and adapted to receive a valve 47. To aid in filling the reservoir 16 there is provided an air vent passage 41a which extends through the block 41 and communicates with the chamber 17 by way of spacer ring 18. A suitable removable cap member 49 is supplied to plug the vent line 41a.

It will be noted, in this particular arrangement, that the passages or ports of the four-way valve 26 and the three-way valve 30 are both carried by the common plug member 55, Fig. 2. The passages for the valve 26 and the valve 30 are arranged in two different rows and may be disposed either internally of the rotatable plug member 55 or may comprise grooves on the outer surface of the plug member 55 each extending approximately one-fourth of the distance therearound as schematically illustrated in Fig. 1A. It will readily be apparent from Fig. 2 that by making appropriate changes in plug member 55 and the associate flow passages connecting thereto, the pump 10 shown in Fig. 2 can be converted to one corresponding in construction to reagent pump 10a having only one row of valve passages corresponding to valve 26a, or it may be connected as in the case of reagent pump 10b, Fig. 1A, with two rows of passages corresponding to valves 26b and 30b to pump two different reagents from inlets 25 and 56, Fig. 3, and discharge them from the corresponding outlets 33 and 31. In this latter arrangement both of the valves 26b and 30b would be of the three-way type as schematically illustrated in Fig. 1A. Inlet 56 has been shown in phantom in Fig. 3 and it would connect with the second layer of ports indicated at 30.

The plug 55 is adapted to be rotated in 90° steps by means of the intermittently operated motor drive unit 35, Fig. 2. The motor drive unit includes a motor shaft 35a on which is mounted a clutch which interconnects the shaft 35a with a gear train in gear box 35b. The clutch is of the type which engages automatically when the motor is energized and disengages when the motor is deenergized. The output shaft from the gear box 35b is shaft 59. When the motor is energized, a driving pin 61 mounted in the end of motor output shaft 59 engages a slot in the valve stem 37a to rotate the valve stem 37a which in turn rotates the valve plug 55 one quarter of a turn or 90°. Accurate positioning of the ports in valves 26 and 30 in valve plug 55 is obtained by means of cam lobes (rises and dwells) on the cam 37 which actuates the limit switch 38 to energize and deenergize the motor 35. A spring retainer 58 is mounted on a hollow shaft 58a so that it is free to rotate with valve stem 37a and a spring 60. The spring 60 provides the necessary pressure to hold the valve plug 55 tightly in its seat in the pump body 40. The motor drive 35 is mounted on a front plate 65 by means of screws 66 and the plate is fixed to the block 40 by screws 67. The adjusting screw 22 is adapted to extend through the plate 65 so that the volume of the pumping chambers may readily be adjusted.

*Section II.—Photocolorimeter*

Referring again to Figs. 1A and 1B, it will be seen that after the samples of liquid and reagents leave their respective controlled volume dispensing pumps 10, 10a and 10b, Section I, they are delivered by way of lines 31, 33, 31a, 31b and 33b to the corresponding comparison cell 32 and the sample cell 34. These cells are transparent and comprise part of the photocolorimeter in Section II of the apparatus. The photocolorimeter is of the comparison type in which the transmittancy or absorption of the sample is directly proportional to the ratio of the intensity of the light beam $I_1$ transmitted through the sample cell 34 with respect to the intensity of the light beam $I_2$ transmitted through the comparison cell 32. The light beams radiate from a common source illustrated as lamp 70 which is adapted to throw beams of light having an intensity $I_0$ in two directions through collimating lens 71, 71 and thence through the sampling cell 34 and the comparison cell 32. After passage of the light beams through the respective sampling cell 34 and comparison cell 32 they have corresponding intensities $I_1$ and $I_2$. These beams, either by means of reflecting prisms or mirrors 73, 73 are directed through their respective filters 74, 74 and lenses 75, 75 to their corresponding photocells 76, 77. The light beam having intensity $I_1$ and passing through the sampling cell 34 is received by photocell 76 while the light beam passing through the comparison cell 32 and having intensity $I_2$ is received by the photocell 77. The radiant energy filters 74, 74 may be of either the interference type or absorption type. The purpose of these filters is to pass only the wavelengths of radiant energy to which the particular analysis is most sensitive. The photocells 76, 77 may be of the conventional vacuum tube type or they may be of the photomultiplier type. The only essential requirement of these photocells is that their response must be linear. That is to say, the current output from each of the tubes must be directly proportional to the intensity of radiant energy received by the tubes. This is a common characteristic of standard vacuum type phototubes.

In operating the system, equal volumes of sample liquid are discharged by the sample pump 10 from a common supply by way of lines 31 and 33 respectively to the comparison cell 32 and the sample cell 34. With this novel arrangement the same liquid is dispensed into both cells 32 and 34 and thus there is automatic compensation for any turbidity or color in the sample liquid. The reagents and buffers to produce the necessary color are next added to the sample cell 34 by the reagent pumps 10a and 10b. For example, in a silica determination pump 10a may be used to dispense a controlled volume of ammonium molybdate and hydrochloric acid to the sample cell 34. The hydrochloric acid acts as a buffer to assist the resulting chemical reactions. The pump 10b may be used to dispense a controlled volume of oxalic acid to cell 34 so that the resulting solution will contain only silico-molybdic acid in complexed form. The same pump 10b also may be used to dispense the reducing agent for converting polymolybdic acids to molybdenum blues. The agent chosen, for example, sodium sulfite and sodium hydrogen sulfite 1-amino-2-naphthol-4 sulfonic acid, is just strong enough to attack the heteropolymolybdic acids. Stronger reducing agents would also convert the iso-poly-molybdic acid to molybdenum blue. Since the only heteropoly acid remaining is silico-molybdic acid the colloidal molybdenum blue formed is a direct measure of the original silica concentration.

The color of molybdenum blue is, of course, blue,

However, since it is colloidal in nature, it acts as a shade to prevent passage of light at all wave lengths. This is particularly true in the red range. The spectrum will then show a color peak in the blue range due to the color of the material. In addition, there will be blocking of transmittance throughout the spectral range (broad band absorption curve) which becomes most apparent in the red or near infra red range. This type of screening more nearly follows the Beers Lambert law than actual color absorption does. Therefore, measurement is made in the red range at about 815 millimicrons and in effect, the instrument acts as a turbidimeter to measure a concentration of colloid present.

After allowing sufficient time for the reagents to complete the reactions, for example, thirty seconds to three minutes depending upon reaction time, the measuring circuit, Section III, is operated to determine the concentration of the constituent being measured, for example, silica. Upon completion of the measurement, the measuring cells 32 and 34 are drained by the opening of the drain valves 80 and 81 which are actuated by a valve lever 95 and a solenoid 83. The cells are then flushed with process fluid supplied by pump 10 and the instrument is then ready to repeat the above cycle of operation.

Figure 5:
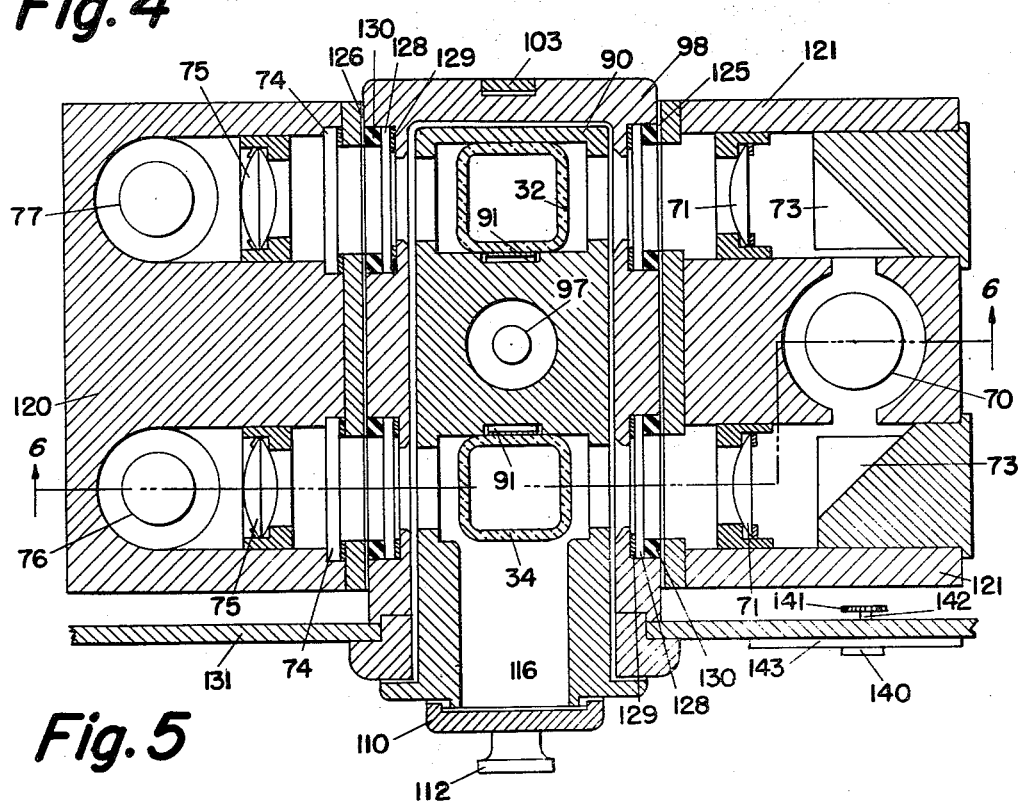
Fig. 5 is a plan view in section taken along the lines 5—5 in Fig. 4.
Figure 6:
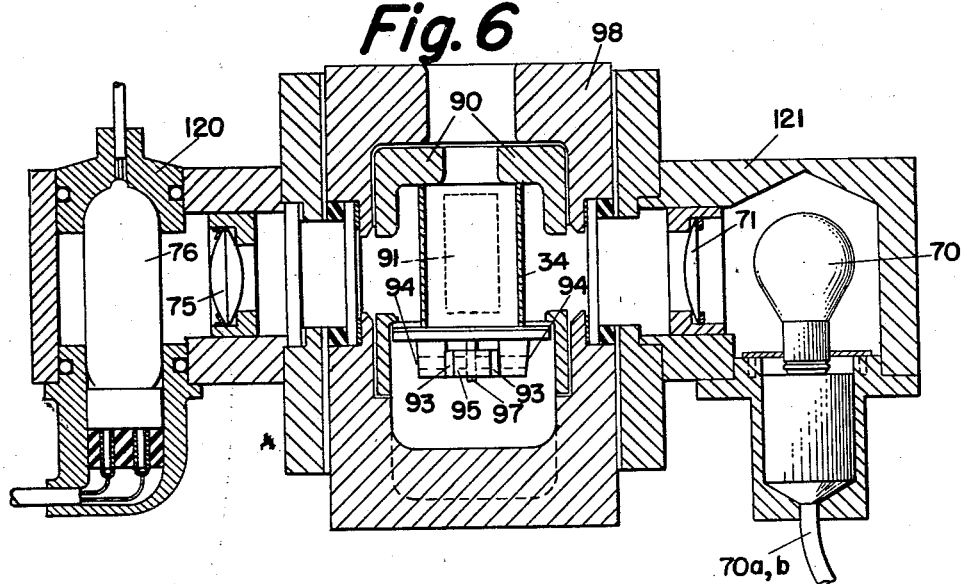
Fig. 6 is a sectional view taken along the lines 6—6 in Fig. 5.
Figure 7:
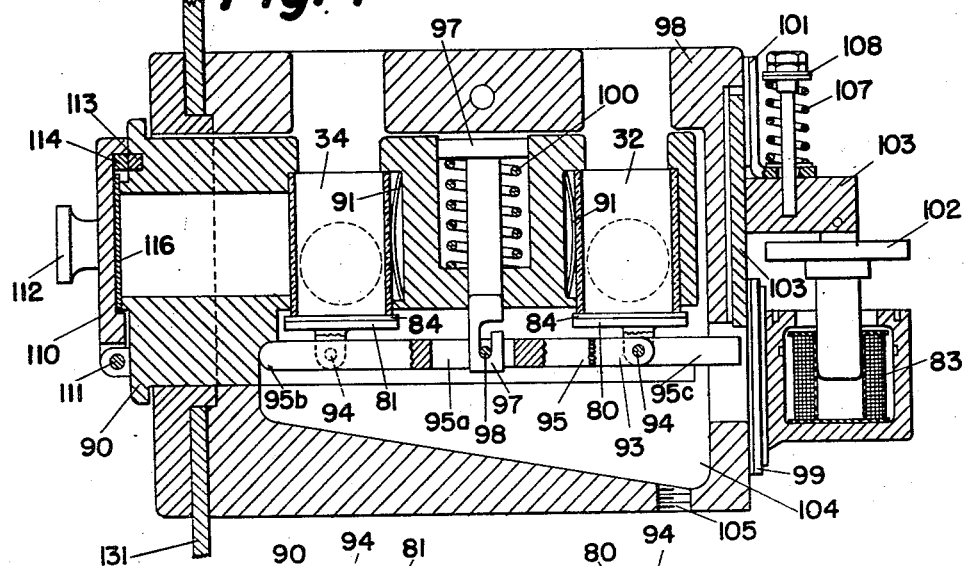
Fig. 7 is a sectional view taken along the lines 7—7 in Fig. 4.

The transparent cells 32 and 34, Figs. 5-7, are of novel construction and comprise relatively short sections of glass or other transparent tubing. The tubing may be of any cross-section, such, for example, as round or rectangular with the tops and bottoms both being open. The bottoms of the tubing members are adapted to be closed off by means of relatively soft plastic covered valve plates 80, 81 which serve a dual purpose as the bottoms for the measuring cells as well as drain valves. The plates 80, 81 preferably are covered with a chemically resistant material 84, such, for example, as a fluorocarbon resin. Examples of fluorocarbon resins are polytetrafluoroethylene sold under the trademark "Teflon" and polychlorotrifluoroethylene sold under the trademark "Kel-F." Such material also has the characteristic of resisting the adhesion of liquids. This construction permits rapid and complete drainage of the cells 32 and 34 as well as providing for ease in cleaning the cells.

Figure 8:
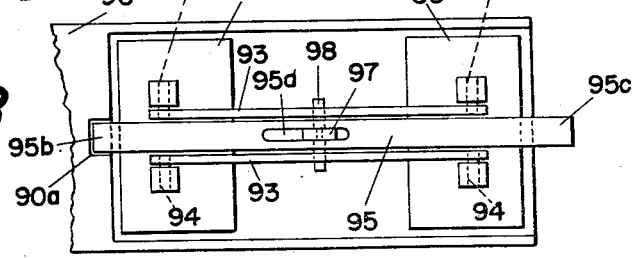
Fig. 8 is a bottom view of the cell holder assembly shown in section in Fig. 7.

The cell holder assembly, Figs. 7 and 8, includes a cell holder 90 containing therein the cells 32 and 34 and which are held in place by the curved holding plates 91, 91. The bottoms of the cells are provided with valves in the form of the valve plates 80, 81 covered on their upper surface with Teflon (polytetrafluoroethylene) gaskets 84, 84. The valve plates 80, 81 are pivotally carried at the opposite ends of a pair of spaced valve levers 93, 93 by pins 94, 94. A valve operating lever 95 is disposed between the valve levers 93, 93 and at its center is a slot 95a through which extends the lower hook end of the valve plunger 97 which is adapted to engage the plunger holding pin 98 extending through the spaced levers 93, 93. A valve spring 100 surrounds the valve plunger 97 with its lower end engaging the holder 90 and its upper end engaging a shoulder on the plunger 97. The valve spring 100 is adapted to hold the valve plates 80, 81 tightly against the bottoms of the respective measuring cells 32 and 34. It will be noted, Figs. 7 and 8, that the left-hand end 95b of the valve operating lever 95 is held within a recess 90a and against the cell holder 90. The valve operating solenoid 83 is mounted at the rear end of the cell holder 90 by stationary brackets 99 and 101 attached to the frame 98. When the solenoid 83 is energized, its plunger 102 moves downwardly causing the striker device 103 to engage the right-hand end 95c of the valve lever 95, causing the latter to pivot about its left-hand end 95b. This action pulls down the plate valves 80 and 81 at the bottom of cells 32 and 34 permitting them to drain into the drain chamber 104 at the bottom of frame 98 which is provided with an outlet 105. The plate valves 80 and 81 are pivoted off-center to the spaced levers 93, 93 so that when the plates 80 and 81 are lowered they gravity tilt or slope at a fixed angle to permit complete drainage of all drops of liquid from the surfaces of their gaskets 84. By providing the spaced levers 93, 93 along the sides of the central valve operating lever 95 there is attained equal openings for the valve plates of both cells 34 and 32 although cell 34 is located nearer the pivotal point 95b of the central valve operating lever 95, Fig. 7.

When the solenoid 83 is deenergized, the plunger 102 and the striker 103 are moved upwardly to the position shown in Fig. 7. This action results from the biasing force of the return spring 107 carried by the post 108 which is fixed at its lower end to the striker device 103, the spring 107 having previously been compressed between the upper abutment on post 108 and the bracket 101 during energization of the solenoid 83. The vertical portion of the striker device 103 is adapted to slide in ways formed by the brackets 99 and 101 and in its upper position, Fig. 7, it is spaced above the lever 95 a predetermined distance to permit the striker 103 to be accelerated by the solenoid 83 before the striker engages the lever 95 on the down stroke. This assures that the valves for the cells 32 and 34 will be opened quickly when the solenoid 83 is energized. When the solenoid 83 is deenergized, the spring 100 returns the lever 95 to the position shown in Fig. 7 and closes the bottoms of the cells 32 and 34 with their respective valve plates 80 and 81. While a single spring has been shown diagrammatically in Fig. 1B it has been identified with both reference characters 100 and 107 to indicate that it performs the function of the two springs 100 and 107 shown in Fig. 7.

To permit inspection of the interior of the cell holder assembly, the cell holder 90 may be withdrawn from the interior of the frame 98 or the inspection door 110 which is pivoted at 111 to the cell holder 90 may be opened, Fig. 7. The inspection door 110 is provided with a knob or handle 112 and the door is adapted to be normally held in closed position by means of a magnetic door lock 113 which is adapted to hold there against a magnetic lock keeper 114. The magnetic lock 113 is made from suitable magnet material such, for example, as Alnico. The interior of the door 110 preferably is provided with a gasket 116 forming a seal between the cell holder 90 and the door 110.

As previously mentioned in connection with Fig. 1B, Section II of the analyzer includes the optical system. Referring to Figs. 5 and 6 it will be seen that the two photocells 76 and 77 are disposed in a housing 120 which also houses the lenses 75, 75. At the right-hand end of Fig. 5 is another housing 121 which contains the light source 70, the reflecting prisms 73, 73 and a pair of plano-convex lenses 71, 71. The housing 121 is held tightly against the central unit containing the cell holder assembly with a gasket 125 being disposed between the frame 98 and the housing 121. A similar gasket 126 is disposed between the opposite side of frame 98 and the housing 120. The housings 120 and 121 are provided with apertures in alignment with apertures in the frame 98 and in the cell holder 90 so that the light beams originating at the source 70 may be directed through the windows of the comparison cell 32 and the sample cell 34 and received by the respective phototubes 77 and 76. It is not imperative that the two light beams originating from the opposite sides of the light source 70 be of equal intensity since automatic compensation for any difference is made in the electrical circuit later to be described in connection with section S-III of the analyzer.

The two light beams are identified in Fig. 1B by the reference character $I_0$ before passage through the comparison cell 32 and the measuring cell 34 where their intensities are changed depending upon the constituents within these cells. The beams emerging from the cells 34 and 32 are respectively identified by reference characters $I_1$ and $I_2$. In a particular installation for the measurement of silica the filters 74, 74, Fig. 5, were absorption type filters having the characteristic of passing radiant energy only in the wavelength band between about 800 millimicrons and about 850 millimicrons. The phototubes 76 and 77 were of the vacuum type available commercially under the designation of No. 925. It is to be understood that other types of filters having different transmission characteristics and phototubes having different sensitivities may be employed in the system depending upon the particular analysis to be made.

The photocolorimeter unit includes means for preventing moisture or other foreign matter from passing from the cell holder assembly into the housing 120 for the phototubes 76 and 77 and the housing 121 for the light source 70. This is accomplished by the glass windows 128, gaskets 129, and spacers 130 disposed on opposite sides of each of the cells 32 and 34, Fig. 5. The unit is adapted to be mounted behind a panel 131 with the cell holder 90 being accessible from the front of the panel 131.

Figure 4:
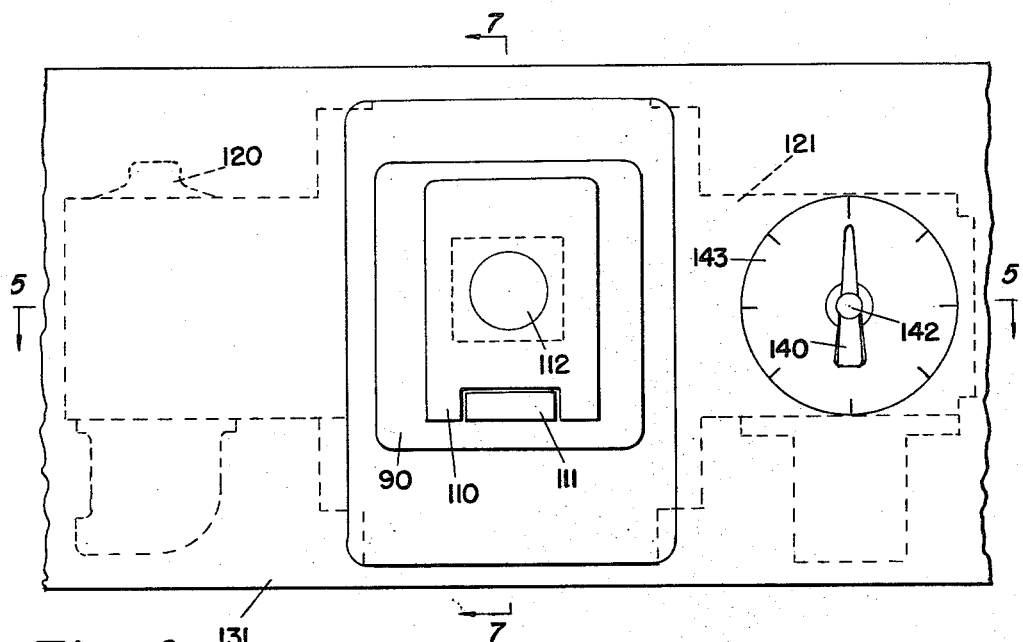
Fig. 4 is a front elevation of the colorimetric analyzer.

From the foregoing description of the photocolorimeter unit, Figs. 4–6, it will be seen that such unit is of rugged construction and easily cleaned. As the photocells are included in the overall housing of the unit, it is possible to keep the chemicals and reagents at a substantial distance from the remainder of the system. For example, the measuring and recording circuit, hereinafter to be described, may be several hundred feet away from the photocolorimeter unit as the length of the conductors from the photocells to the measuring circuit is not critical.

Section III.—Measuring and recording circuit

Referring to Fig. 1B and particularly section S–III, it will be seen that the phototubes 76 and 77 are included in opposite legs of a bridge type measuring circuit. One leg of the bridge circuit includes the phototube 77 and a resistor 150 while the phototube 76 is included in another leg of the bridge circuit along with a resistor 151. The third leg of the bridge circuit includes the potentiometer resistance 152 and a resistor 153 having a combined resistor $R_2$ while the fourth leg of the bridge circuit includes the potentiometer resistance 155 and the resistor 156 having a combined resistance $R_1$. The potentiometer 152 is a balancing potentiometer with its movable contact 172 mechanically positioned by a reversible drive motor 157 of the recorder which includes the recorder chart 158 and a recorder pen 159. The voltage $E_2$ across the potentiometer 152 is proportional to the current output $i_2$ of the phototube 77 due to the light beam intensity $I_2$ which passes through the comparison cell 32. The other potentiometer 155 is automatically adjusted to provide zero output and is positioned by means of a standardization motor 160 through a mechanical linkage indicated by the broken line 161. The voltage $E_1$ across the potentiometer 155 is proportional to the current $i_1$ which results from the light intensity $I_1$ which passes through the sample cell 34. By means of the automatic standardization provision in this novel system, as now to be described, there is automatic compensation for any unbalance of the intensity of the light beams $I_1$ and $I_2$ resulting from any dirt on the optical system, uneven light distribution from the lamp source 70, accumulation of dirt on the windows of the sample cells, and any difference in sensitivity of the two phototubes 76 and 77. Such unbalance would not be related to differences in concentration between the fluids in the sample and measuring cells and thus would produce errors in measurement of the transmission of the sample.

As aforementioned, the light beam after passage through sample cell 34 has an intensity of $I_1$. When this light beam $I_1$ strikes the phototube 76, there will be produced an output current $i_1$ which is equal to $K_1I_1$, where $K_1$ is the cell constant of the measuring photocell 76 expressed in micro amperes per lumen. The intensity of the light beam passing through the comparison cell 32 is $I_2$ and when it falls on the photocell 77 there is created a current output $i_2$ which is equal to $K_2I_2$, where $K_2$ is the cell constant for the reference photocell 77 expressed in micro amperes per lumen. If the total resistance across resistors 153 and 152 is considered as $R_2$, Fig. 1B, then the resistance between conductor 192 and movable contact 172 may be considered as $xR_2$ where $x$ is a percent of $R_2$. Thus the voltage $E_2$ will be equal to the following Equation 1:

$$E_2 = (xR_2)i_2 = xR_2K_2I_2$$

Similarly if the total resistance across the resistors 156 and 155 is considered as $R_1$ then the resistance between the movable contact 155a and conductor 192 will be equal to $yR_1$ where $y$ is a percent of $R_1$. Thus the voltage $E_1$ will be equal to the following Equation 2:

$$E_1 = (yR_1)i_1 = yR_1K_1I_1$$

During standardization of the instrument the light beam $I_1$ will have an intensity of a specific value such as $I_1'$. Since the comparison cell 32 has the same fluid in it during standardization as during the recording portion of the cycle, the intensity $I_2'$ at standardization will be equal to the light intensity $I_2$ during recording. By moving the tap 172 of the potentiometer 152 to the top of the resistance $R_2$ then $x$ will be made equal to unity and by adjustment of contact 155a, $y$ will be adjusted to make $E_1$ equal to $E_2$. By substitution we have the following Equation 3:

$$yR_1K_1I_1' = xR_2K_2I_2$$

Solving the above Equation 3 for $y$ we have Equation 4:

$$y = \frac{R_2}{R_1} \cdot \frac{K_2}{K_1} \cdot \frac{I_2}{I_1'}$$

Under conditions of recording $E_1$ will also equal $E_2$ and by substitution we have the following Equation 5:

$$yR_1K_1I_1 = xR_2K_2I_2$$

Substituting in the above Equation 5 for $y$ the expression obtained in the preceding Equation 4 and simplifying we arrive at the following Equation 6 where:

$$x = \frac{I_1}{I_1'} = T$$

Thus it will be seen by standardizing the instrument in accordance with the present invention the calibration will be such that the instrument is independent of the photocell characteristics and that the value of $x$, which is the same as the transmittency of the meausring cell 34, will be dependent solely upon the ratio of the light intensity $I_1$ passing through the measuring cell 34 after the reagent has been added as compared with the intensity of the light beam $I_1'$ passing through the measuring cell 34 during standardization and before addition of the reagents.

The potentiometers 152 and 155 provide the main measuring portions of the bridge circuit, for example, each having a resistance in the order of 100 k. The resistor 153 in series with potentiometer 152 and the resistor 156 in series with the potentiometer 155 are provided to extend the range of the instrument. For example, if the resistance of resistor 153 is equal to the resistance of the potentiometer 152, the recorder pen 159 will cover a transmittency range of 50% to 100%. If resistor 153 is replaced with another having a value of resistance as low as zero, the recorder pen 159 will have a range of transmittency of 0% to 100%. For automatic standardization of the instrument, the potentiometer 152 is provided with a fixed tap 170 corresponding to 100% transmittency. By moving the switch 171 into engagement with the contact $b$ of tap 170, the instrument will be automatically standardized. The movable or variable tap 172 of the potentiometer 152 is employed for automatic recording. The taps 170 and 172 are automatically selected by means of the switch 171 for performing the recording and automatic standardization cycles as later to be described. The switch 171 preferably is operated by a timing motor 180 in sections S–IV of the analyzer illustrated at the bottom of Fig. 1A and which includes the cycle controlling or programming apparatus for the analyzer.

To provide a zero check point for the instrument, the measuring circuit may include the potentiometer 181, Fig. 1B, which is connected in parallel with the potentiometer 155 and resistor 156. The resistance of potentiometer 181 is high, for example in the order of two megohms. The potentiometer 181 will by-pass a small amount of current from the phototube 76 and by properly adjusting the movable contact 182 on the potentiometer 181 there will be provided a voltage which corresponds to the zero pen position of the recorder pen 159. By manual operation of the zero check switch 183 from tap 155a to tap 182, it is possible to make a quick check on the calibration of the circuit. It is to be understood that the switch 183 could be operated automatically by timing motor 180.

The energy for operating the bridge circuit is supplied from a high voltage B+ supply through a resistor 184 which is connected by way of conductor 185 to a junction between resistors 150 and 151 which are in series respectively with photocells 77 and 76 in opposite legs of the bridge circuit. The B— or ground connection is connected to conductor 192 which connects the lower ends of the resistor 153 and the resistor 156. A resistor 187 is connected between conductor 185 and conductor 188, the latter connecting a capacitor 189 in shunt relation with the potentiometer 155 and resistor 156. The resistor 187 is a "bleed-off" to provide voltage regulation for the circuit. The capacitor 189, which is connected across the potentiometer 155 and the resistor 156, and the capacitor 190, which is connected across the potentiometer 152 and the resistor 153, are provided for by-passing any stray A.C. voltages which may be picked up by the circuit, for example, by the leads to the photocells 76 and 77.

The detector for the bridge circuit has been illustrated as an A.C. detector 200 of the null type which is used to detect any unbalance between the potentiometers 152 and 155. The detector 200 includes means for converting the difference between the D.C. outputs of the two potentiometers into an alternating current whose phase depends upon which of the D.C. outputs is greater. This may be accomplished by an arrangement of the type disclosed in Tarpley Patent 2,622,192. The alternating current output from the synchronous chopper is fed to a conventional alternating current servo amplifier, which is also included in rectangle 200, the output of the amplifier in turn being fed by way of the conductors 200a and 200b to the switches 204 and 205 to energize the balancing and recorder pen drive motor 157 or to energize the automatic standardization motor 160. The switches 204 and 205 are selectively actuated by the timing motor 180 and provide the recording and automatic standardization cycles.

The circuit described above is of the null balance type and, therefore, is insensitive to fluctuations in line voltage and lamp brightness. It is also independent of phototube sensitivity and, therefore, is not affected by changes in temperature. All that is necessary is that the output of the phototubes 76 and 77 be linear with the intensity of illumination.

The recorder pen 159 will be operated to indicate the percentage transmittency of the sample cell 34 on the circular chart 158. By selection of chart paper with appropriate scales, the recorder can be made to provide direct readings in parts per million, percent or any other selected units. For those sample solutions which obey Beer's law for the absorption of light, the output from the detector 200 can be made linear with percent concentration by means of a potentiometer with a logarithmic taper.

*Section IV.—Cycle programming timer*

Referring to Figs. 1A–1B, it will be seen that there is provided a synchronous timing motor 180 energized from the A.C. power supply $L_1$, $L_2$ automatically to control the cycle of the analyzer. The timing motor is provided on its shaft with suitable means, for example, a series of cams (not shown) for operating a plurality of limit switches 171, 204–209. With each rotation of the shaft of motor 180, the various cams carried by such shaft likewise will make one rotation and operate their associated switches through a predetermined cycle. Referring to Fig. 9, there is illustrated a timing diagram of a control cycle for the analyzer. As will be seen in Fig. 1A, all of the switches 207–209 are connected to one side of the line $L_1$ by way of conductor 210. At the start of a cycle, Fig. 9, the switches 171, 204–209 are in the positions illustrated. The switches 171, 204–209 are operated in accordance with the respective curves 211–217. The switch 171 is in record position completing a circuit through contact a. The switch 204 in the recorder pen motor circuit is in the deenergized position with the switch 204 in engagement with contract c. The switch 205 to the standardization motor circuit likewise is in deenergized position with the switch 205 in engagement with contact e. The switch 206 in the lamp brightness control circuit is in the dim position with the switch 206 in engagement with contact g. The purpose of the lamp brightness control will be later described. The switch 207 in the circuit of the solenoid valve 83 is in its open position with the switch in engagement with contact j. The switch 208 in the control circuit for the sample pump 10 is in engagement with contact m. The switch 209 which is in the control circuit for the reagent supply pumps 10a and 10b is in engagement with the contact p.

It will be assumed that a cycle of the analyzer has just been completed and the cells 32 and 34 are filled with fluid from the analysis. To dump or drain these cells, switch 207 is moved out of engagement with contact j and into engagement with contact k energizing the solenoid 83, Fig. 1B, and causing the valve plates 80 and 81 to be moved downwardly and permitting the fluid within cells 32 and 34 to drain. After a predetermined interval the draining operation is completed and the switch 207, Fig. 9, is moved again into engagement with contact j to deenergize the solenoid 83 and permit the return spring 100, Fig. 1B, to close the valve plates 80 and 81 on the cells 32 and 34. After the cells 32 and 34 have been drained and their valve plates closed, the cells are flushed with sample fluid from sample pump 10. To accomplish the flushing operation the switch 208 is moved from a first position in engagement with contact m to its second position in engagement with contact n. This completes a circuit, Fig. 1A, from one side of the line $L_1$ through switch 208, contact n, through conductor 225 to switch 38, through motor 35 and the return line 226 to the opposite side of the power supply $L_2$. This energizes the gear motor 35, Fig. 1A, and rotates the positioning cam 37 in a clockwise direction through 90° of travel. During this interval, liquid is pumped from chamber 11 of the sample pump 10 through discharge pipe 31 to the comparison cell 32. At the end of the one-quarter revolution by cam 37, the switch 38 is permitted to move upwardly disengaging the contact r and breaking the circuit through conductor 225 to deenergize the motor 35. The switch 38 at this time is in engagement with contact s which is in circuit with conductor 230. The cam which controls switch 208 then moves the latter from its second position to the first position into engagement with contact m completing the circuit through conductor 230 to again energize motor 35 during 90° rotation of cam 37. During this time interval the sample pump 10 delivers from chamber 12 a controlled volume of sample fluid through discharge line 33 into the sample cell 34. This completes the flushing cycle of the analyzer.

After the flushing cycle is completed, the switch 207 again moves into engagement with contact $k$ to close the circuit and energize the solenoid 83 to repeat the drain cycle as indicated by curve 215, Fig. 9. The filling cycle of the cells 32 and 34 is then initiated in similar manner to the previous flushing cycle as indicated by the curve 216. At this stage of the cycle, the reference cell 32 and the measuring cell 34 have both been filled with a controlled volume of sample fluid from the controlled volume pump 10, Fig. 1A.

The system is then ready for standardization preparation. The switch 206, which previously has been in engagement with contact $g$ to provide a dim light (low voltage) from lamp 70, is then moved into engagement with contact $h$ to bring the lamp up to its maximum operating voltage and brightness. The lamp 70, for example, may be of the type having a rating of 30 watts and 6 volts. As shown in Fig. 1A, the lamp 70 is connected across the secondary $250s$ of a lamp filament transformer 250. The primary $250p$ of the transformer is adapted to have its input supplied from the 110 volt, 60 cycle power source $L_1$, $L_2$ and the secondary $250s$ of the transformer 250 is adapted to have a low voltage output of 6 volts. The resistance $251a$ across the relay 251 and a control resistor 252 are connected in series circuit with the lamp 70 so that the lamp will operate at a reduced voltage and output. For example, with a 30 watt lamp and a resistance 252 of about 1 ohm and a resistance $251a$ of about 2 ohms, the lamp 70 will operate at about 10% of its rated values. During the measuring and automatic standardization portions of the cycle, the timer switch 206 is in engagement with contact $h$ shorting out the resistance $251a$ and the resistor 252 so that the lamp 70 will operate at maximum voltage and brightness. The resistor $251a$ shunting the relay 251 carries the minimum required lamp current and permits the use of a standard 3 volt relay in the circuit. Provision has also been made in the lamp control circuit to provide an indication if there should be failure of lamp 70. When the switch 206 is in engagement with contact $g$ the relay 251 will be energized provided the filament in lamp 70 has not failed and the normally closed relay contact 256 will be open so that the lamp failure circuit will not be energized. If the lamp filament is broken the relay 251 will not open the normally closed contact 256 and a lamp failure alarm device will operate. Such device may comprise a thermal flasher 257 and a pilot lamp 258 to signal a flashing light upon failure of lamp 70.

To complete the preparation for standardization, the timing motor 180 operates switch 171 from its recording position in engagement with contact $a$ to its standardization position in engagement with contact $b$ as illustrated by curve 211, Fig. 9.

Standardization of the analyzer is accomplished by moving switch 205 from its deenergized position in engagement with contact $e$ to its energized position in engagement with contact $f$, Figs. 1B and 9. In this position the output from detector 200 energizes the coils of the standardization motor 160 to position the movable contact $155a$ of potentiometer 155 until a zero output is derived from the detector 200. At this time the standardization motor 160 stops and the switch 205 is moved into engagement with contact $e$ as illustrated by curve 213 in Fig. 9. After the standardization is completed the switch 171 is moved back into engagement with contact $a$ in preparation for a recording operation.

With the analyzer standardized, as above described, the switch 209 for controlling the reagent pumps $10a$ and $10b$ is moved from its first position in engagement with contact $p$ to its second position in engagement with contact $q$ completing a circuit from one side of the line $L_1$ through switch 209 and contact $q$ through conductor 260 and contact $v$ through switch $38b$ and motor $35b$ through conductor 261 and to the opposite side of the line $L_2$. A circuit is also completed from conductor 260 through conductor 262, through contact $t$ and switch $38a$ through motor $35a$ and conductor 263 and conductor 261 to the opposite side of the line $L_2$. Thus both reagent motors $35a$ and $35b$ for the respective reagent pumps $10a$ and $10b$ are energized to move their respective positioning cams $37a$ and $37b$ through 90° of rotation. The cams $37a$ and $37b$ are similar to cam 37 and are operated in similar manner. After the 90° of rotation the switches $38a$ and $38b$ are operated to break the circuits through their respective contacts $t$ and $v$ and move the switches $38a$ and $38b$ into engagement with contacts $u$ and $w$ respectively. At this time a chamber full of reagent has been delivered from each of the reagent metering pumps $10a$ and $10b$ to the sample measuring cell 34. When the switch 209 is moved out of engagement with contact $q$ to its second position in engagement with contact $p$ the reagent pumps $10a$ and $10b$ are operated by means of their respective motors $35a$, $35b$ and valves $26a$, $26b$ and $30b$ to discharge another chamber full of reagent into the measuring cell 34.

After the foregoing operations the analyzer is ready to record the transmittancy T of the sample cell 34 on the circular chart 158. The switch 204 is moved from its deenergized position in engagement with contact $c$ into its energized position in engagement with contact $d$ to apply the output from detector 200 to the recorder motor 157 and adjust the movable contact 172 on potentometer 152 until the output of detector 200 has been reduced to zero. At this time the switch 204 is operated by the timing motor 180 to deenergize the recorder motor 157 and move switch 204 into engagement with contact $c$ as illustrated by curve 212 in Fig. 9. The switch 206 is moved into engagement with contact $g$ to reduce the brightness of the lamp 70 by again inserting the resistors $251a$ and 252 in the lamp circuit. This completes the cycle of the automatic colorimeter analyzer. The cycle may be repeated in accordance with any predetermined program.

From the foregoing it will be seen that during the periods of the cycle when the measurements are not being made the lamp 70 will be operated at a low value of current to keep its temperature at a very low rating. By so limiting the periods of full brightness the lamp life is greatly extended. For example, where the time to complete a cycle of the analyzer is about three minutes, the lamp will be operated at full brightness, i.e. during the standardizing and measuring portions of the cycle, for only about thirty seconds. Thus the lamp will have a life of about 10,000 hours or one year which is a substantial increase over the continuous ratings for the lamp of about 3,000 hours or four months' life.

To indicate the portion of the cycle of the analyzer at any given time there is provided a pointer or indicator 140 driven in synchronism with timing motor 180 by way of a gear 141 and a shaft 142. Cooperating with the indicator 140 is a dial 143 which is provided with appropriate markings to correspond to the various portions of the cycle of Fig. 9. By adjusting the shapes of the cams driven by motor 180 for operating the various switches it is possible to vary the duration of the cycle portions within limits. Thus the program of the analyzer may be predetermined in accordance with the particular analysis to be performed. For example, in analyses where the reaction time is slow the time interval between the addition of the reagents and the measurement portion of the cycle may be increased.

From the foregoing it will be seen that the present invention provides an accurate and reliable controlled volume dispensing means for automatically feeding the sample fluid and the various reagents to the photocolorimeter. The photocolorimeter, which is of the comparison type, by reason of its novel construction automatically compensates for any turbidity or color in the fluid being measured. The automatic standardization of the measuring circuit during each cycle of the analyzer eliminates from the measurements any errors due to differences in light beam intensities arising from any accumulation of dirt in the optical system or on the windows of the sample cells. The measuring circuit is of the null-balance type which is independent of variations in light source brightness, pototube characteristics, temperature, and line voltage. Provision is also made for increasing the normal life of the radiant energy source and the analyzer construction is both rugged and reliable so as to be adapted for use both in industry and in research for automatically sampling and analyzing a wide variety of fluids. The novel construction of the cell holder unit provides easy access to both the sample cell and the reference cell for inspection or cleaning.

While there has been described a preferred embodiment of the invention, it will be understood that further modifications may be made without departing from the spirit and scope of the invention as set forth in the appended claims.

What is claimed is:

1. A colorimetric analyzer comprising controlled volume fluid dispensing means for a sample of fluid to be analyzed, controlled volume fluid dispensing means for adding reagent to a predetermined volume of the sample fluid, a comparison cell, a sample cell, a source of radiant energy positioned so that radiant energy passes through each of said cells, ratio-measuring means including radiant energy sensitive devices positioned to receive radiant energy after passage through each of said cells, said ratio-measuring means including a standardizing circuit adjustable to bring the circuit to a predetermined reference condition after delivery to both cells of said fluid sample, and said ratio-measuring means further including in circuit with each of said radiant energy sensitive devices, means for restoring a balance between parts of the circuit containing the respective radiant energy sensitive devices after a change of radiation transmission properties in either cell, flow connections between said cells and said dispensing means, means operable under the control of said balance restoring means in said ratio-measuring means for indicating the concentration of an unknown constituent in the sample cell, and a cycle sequence controller to accomplish the following operations: (a) introducing by the sample dispensing means known volumes of sample fluid into each cell, (b) thereafter initiating a standardizing operation by means of the ratio-measuring means, and (c) introducing by the reagent dispensing means at least one reagent into the sample cell in known volume and strength for producing a color change for the fluid in said sample cell which changes the radiation transmission properties of the resultant mixture in the sample cell by an amount related to the concentration of an unknown constituent in the fluid within said sample cell whereby the amount of the unknown constituent can be determined by the amount of rebalancing which thereafter occurs in the ratio-measuring means.

2. The colorimetric analyzer of claim 1 in which the means for restoring balance between parts of the ratio-measuring means circuit is a rebalancing potentiometer.

3. A colorimetric analyzer according to claim 1 wherein said cycle controller comprises a synchronous motor and electrical switching means for operating said controlled volume fluid dispensing means, initiating said standardizing operation and indicating the concentration of said constituent in said sampling cell in predetermined sequence.

4. A colorimetric analyzer according to claim 1 including means for draining and flushing said cells controlled by said cycle controller.

5. A colorimetric analyzer according to claim 1 including means for adjusting the volume of said controlled volume fluid dispensing means.

6. A colorimetric analyzer according to claim 5 wherein said controlled volume fluid dispensing means for the sample fluid and for the reagent each comprises a pump housing divided into a pair of chambers by a pair of spaced flexible diaphragms, and said means for adjusting the volume of said controlled volume fluid dispensing means comprises an adjustable liquid reservoir communicating with the spacing between said pair of diaphragms to vary the spacing between said diaphragms indirectly with respect to the volume of said chambers in said pump housing.

7. An automatic photocolorimetric analyzer including a source of radiant energy, a comparison cell and a sample cell adapted to receive radiant energy from said source, and a cycle controller for operating said analyzer through standardizing and measuring portions of a cycle, and means for continuously energizing said source of radiant energy by automatically decreasing the voltage on said source of radiant energy to a value below normal except during said standardizing and measuring portions of said cycle to increase the life of said source.

8. An automatic photocolorimetric analyzer according to claim 7 wherein said means for decreasing the voltage on said source of radiant energy comprises an electrical circuit having resistance means in series circuit with said source, and switch means in shunt relation with said resistance for shorting out said resistance during said standardizing and measuring portions of said cycle.

9. An automatic photocolorimetric analyzer according to claim 8 including relay means in series circuit with said source of radiant energy and in parallel circuit with said resistance means, and an alarm circuit maintained normally open by said relay means except upon failure of said source of radiant energy.

10. In a photocolorimetric analyzer for chemical analysis of fluids, the combination of a light source, a sample cell, a reference cell, means for passing a portion of the light from said source through said sample cell and impressing the transmitted portion upon a first linear photo-responsive device, means for passing a second portion of the light from said source through said reference cell and impressing the transmitted portion upon a second linear photo-responsive device, resistance means having a fixed tap and a variable tap and connected in series circuit with said first linear photo-responsive device, second resistance means having a variable tap and connected in series circuit with said second linear photo-responsive device, unbalance detector means connected between said variable taps, motor means responsive to said unbalance, said motor means being mechanically connected to said first variable tap, exhibiting means mechanically connected to said motor means, means for connecting said detector between said fixed tap and said second variable tap, and second motor means connected to said second variable tap and responsive to the detector unbalance for standardizing said analyzer.

11. In a photocolorimetric analyzer for chemical analysis of fluids, the combination of a source of radiant energy, a sample cell, a reference cell, means for passing a portion of the radiant energy from said source through said sample cell and impressing the transmitted portion upon a first linear photo-responsive device, means for passing a second portion of the radiant energy from said source through said reference cell and impressing the transmitted portion upon a second linear photo-responsive device, resistance means having a fixed tap and a variable tap, said resistance means being connected in series circuit with said first linear photo-responsive device, second resistance means having a variable tap, said second resistance means being connected in series circuit with said second linear photo-responsive device, unbalance detector means adapted for connection between said taps, means for selectively connecting said detector means in a first position between said fixed tap and said variable tap of said second resistance and for connecting said detector in a second position between said variable taps, motor means mechanically connected to said variable taps, said motor means being responsive to the unbalance to said detector means when said selectively operable means is in said first position for standardizing said analyzer and when said selectively operable means is in said second position for measuring the concentration of a constituent in said sample cell, and exhibiting means driven by said motor means for indicating the concentration of said constituent in said sample cell.

12. In a photocolorimetric analyzer according to claim 11 wherein said motor means comprises a first motor for operating said first-named variable tap and said exhibiting means, and a second motor for operating said second-named variable tap during the standarizing of said analyzer.

13. In a photocolorimetric analyzer according to claim 12 wherein said exhibiting means includes a recorder for recording a value representative of the concentration of said constituent in said sample cell.

14. A photocolorimeter comprising housing means containing therein a source of radiant energy and photo-responsive means, an optical system within said housing for directing two beams of radiant energy from said source to said photo-responsive means, a sample cell and a reference cell disposed in said optical system between said source and said photo-responsive means and each said cell adapted to transmit one of said beams of radiant energy, said cells being open at their upper ends to receive fluids for analysis by said colorimeter, means for sealing the bottom ends of said cells, said sealing means comprising plate members normally held in sealing engagement with respect to the bottom ends of said cells, and means for moving said plate members out of sealing engagement with said cells to drain the fluids from said cells at predetermined intervals.

15. A photocolorimeter according to claim 14 including a holder for said cells, and linkage means carried by said holder for normally holding said plate members in sealing engagement with respect to the bottom ends of said cells.

16. A photocolorimeter according to claim 15 wherein said holder is slidably received by said housing, and said holder and said cells and said plate members and said linkage are removable as a unit from within said housing for inspection of said cells.

17. In a photocolorimeter, the subcombination comprising a cell holder, a sample cell and a reference cell carried by said cell holder, said cells comprising hollow transparent tubing members open at each end thereof, sealing means for closing the bottom ends of each of said cells, said sealing means comprising pivoted plate members, an operating lever for said plates, biasing means effective through said operating lever for holding said plates in sealing relation with the bottom ends of said cells, said operating lever being adapted to move said plates out of sealing relation with respect to said cells whereby said plates are permitted to tilt under the influence of gravity with respect to the bottom ends of said cells for drainage of fluid from said cells.

18. In a photocolorimeter, the subcombination according to claim 17 wherein the surfaces of said plates which engage the bottom ends of said cells are covered with a layer of plastic material having the characteristics of resisting the adhesion and absorption of liquid and of yielding for enhanced sealing relation.

19. In a photocolorimeter, the subcombination according to claim 18 wherein said plastic material is formed from a fluorocarbon resin.

20. In a photocolorimeter, the subcombination comprising a cell holder, a sample cell and a reference cell carried by said cell holder, said cells comprising hollow transparent tubing members open at the bottom ends thereof, sealing means for closing the bottom ends of each of said cells, said sealing means comprising plate members pivotally carried in off-center relation at the opposite ends of spaced links, and an operating lever pivoted to said links at a location intermediate said plates, biasing means effective through said operating lever for holding said plates in sealing relation with said bottom ends of said cells, said operating lever being adapted for rotation about one of its ends to move said plates out of sealing relation with respect to said cells substantially equal distances whereby said plates are permitted to tilt under the influence of gravity with respect to the bottom ends of said cells for drainage of fluid from said cells.

21. A cyclic automatic colorimetric analyzer comprising a source of radiant energy, a comparison cell and a sample cell adapted to receive radiant energy from said source, a measuring system including radiant energy sensitive devices for receiving radiant energy transmitted through said cells, a cycle controller for automatically opening said analyzer through standardizing and measuring portions of a cycle, means for dispensing precisely controlled volumes of sample fluid and reagent fluid into said cells during a portion of said cycle, means for draining refilling said cells during a portion of said cycle, said dispensing means and said draining means being operated by said cycle controller, and means synchronized with said cycle controller for indicating the progress of all of said portions of said cycle.

22. A cyclic automatic colorimetric analyzer comprising a source of radiant energy, a comparison cell and a sample cell adapted to receive radiant energy from said source, a measuring system including radiant energy sensitive devices for receiving radiant energy transmitted through said cells, a cycle controller for automatically opening said analyzer through standardizing and measuring portions of a cycle, means for filling said cells with sample fluid during a portion of said cycle and flushing said cells with sample fluid during another portion of said cycle, means for dispensing reagent fluid into at least said sample cell during a portion of said cycle, means for draining said cells during a portion of said cycle, said filling means and said reagent dispensing means and said draining means all being operated by said cycle controller, and means synchronized with the cycle controller for indicating the progress of all of said portions of said cycle.

References Cited in the file of this patent
UNITED STATES PATENTS

| | | |
|---|---|---|
| 2,063,140 | Allison | Dec. 8, 1936 |
| 2,576,747 | Bryant | Nov. 27, 1951 |
| 2,656,845 | Lindsay | Oct. 27, 1953 |
| 2,682,801 | Davidson et al. | July 6, 1954 |
| 2,854,585 | Simmons | Sept. 30, 1958 |